United States Patent [19]

Vaill et al.

[11] 4,417,108
[45] Nov. 22, 1983

[54] SWITCHGEAR SHUTTER

[75] Inventors: Ronald E. Vaill, Penn Township, Westmoreland County; Stephen S. Ciccotelli, Pitcairn; Carl R. Merola, Monroeville, all of Pa.

[73] Assignee: Westinghouse Electric Corp., Pittsburgh, Pa.

[21] Appl. No.: 302,880

[22] Filed: Sep. 16, 1981

[51] Int. Cl.³ .......................... H01H 9/22; H02B 1/14
[52] U.S. Cl. ................................ 200/50 AA; 361/345
[58] Field of Search .............................. 200/50 AA; 361/335–337, 338, 339, 343, 345

[56] References Cited

U.S. PATENT DOCUMENTS

| | | | |
|---|---|---|---|
| 1,566,935 | 12/1925 | Trenchman et al. | 200/50 AA |
| 1,718,501 | 6/1929 | Trenchman et al. | 361/345 |
| 3,213,222 | 10/1965 | Finley et al. | 200/50 AA |
| 3,614,350 | 10/1971 | Eichelberger et al. | 200/50 AA |
| 4,183,073 | 1/1980 | Clausing | 200/50 AA X |

Primary Examiner—J. R. Scott
Attorney, Agent, or Firm—Benjamin Hudson, Jr.

[57] ABSTRACT

There is provided by this invention a novel switchgear shutter design employing curvilinear displaced shutter means which provide an entirely metallic grounded surface between the potentially live contacts and the front of the compartments. This novel shutter means is disposed to move to a safe and effective distance away from live electrical ports when the circuit breaker is moved into its normal operating position.

12 Claims, 5 Drawing Figures

SWITCHGEAR SHUTTER

BACKGROUND OF THE INVENTION

1. Field of the Invention

This invention relates generally to metal-clad or metal enclosed switchgear and more particularly to shutter mechanisms for switchgear apparatus having circuit interrupters or circuit breakers of the drawout type disposed in metal housings or cubicles.

2. Description of the Prior Art

In the construction of switchgear equipment of the drawout type, the primary movable disconnecting contacts of a circuit interrupter or circuit breaker are often mounted on insulating bushings which are inserted into a plurality of pairs of insulating tubes which are mounted in the associated switchgear housing to engage stationary disconnecting contacts disposed in the insulating tubes. In order to protect operating and maintenance personnel who may have occasion to enter the switchgear housing a shutter means which is usually formed from sheet metal or insulating material has been employed in the past to automatically close the openings to the insulating tubes when the associated circuit breaker is removed from its normal operating position. This shutter, generally, is activated by the breaker moving in and out of the switchgear compartment. As the breaker moves into the cell to be connected into the line, the shutter moves to a position either above or below the fixed electrical contacts. As the required voltage and current ratings of the circuit breakers employed in switchgear apparatus increase in newer applications, it became necessary to provide more efficient and effective shutter designs that maintain a sufficient distance away from any live parts to prevent the possibilities of arcing and to insure the associated apparatus would pass BIL (impulse) testing.

SUMMARY OF THE INVENTION

There is provided by this invention a new and improved switchgear shutter design employing curvilinear displaced shutter means which are disposed to move to a safe and effective distance away from live electrical parts when the circuit breaker is moved into its normal operating position. This invention is also disposed to provide an entirely grounded metal surface between the potentially live contacts and the front of the compartment.

BRIEF DESCRIPTION OF THE PREFERRED EMBODIMENT

Figure 1:
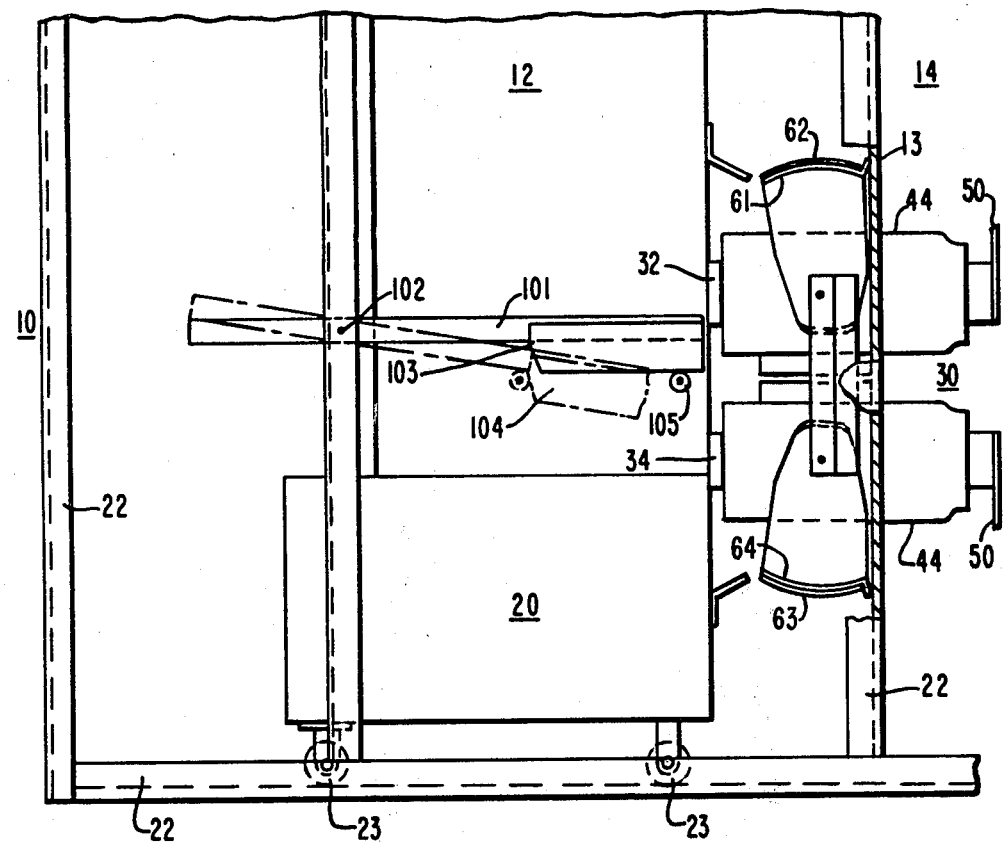
FIG. 1 is a view partly in side elevation and partly in section, of a portion of a metal clad switchgear unit employing the principal features of this invention.
Figure 2:
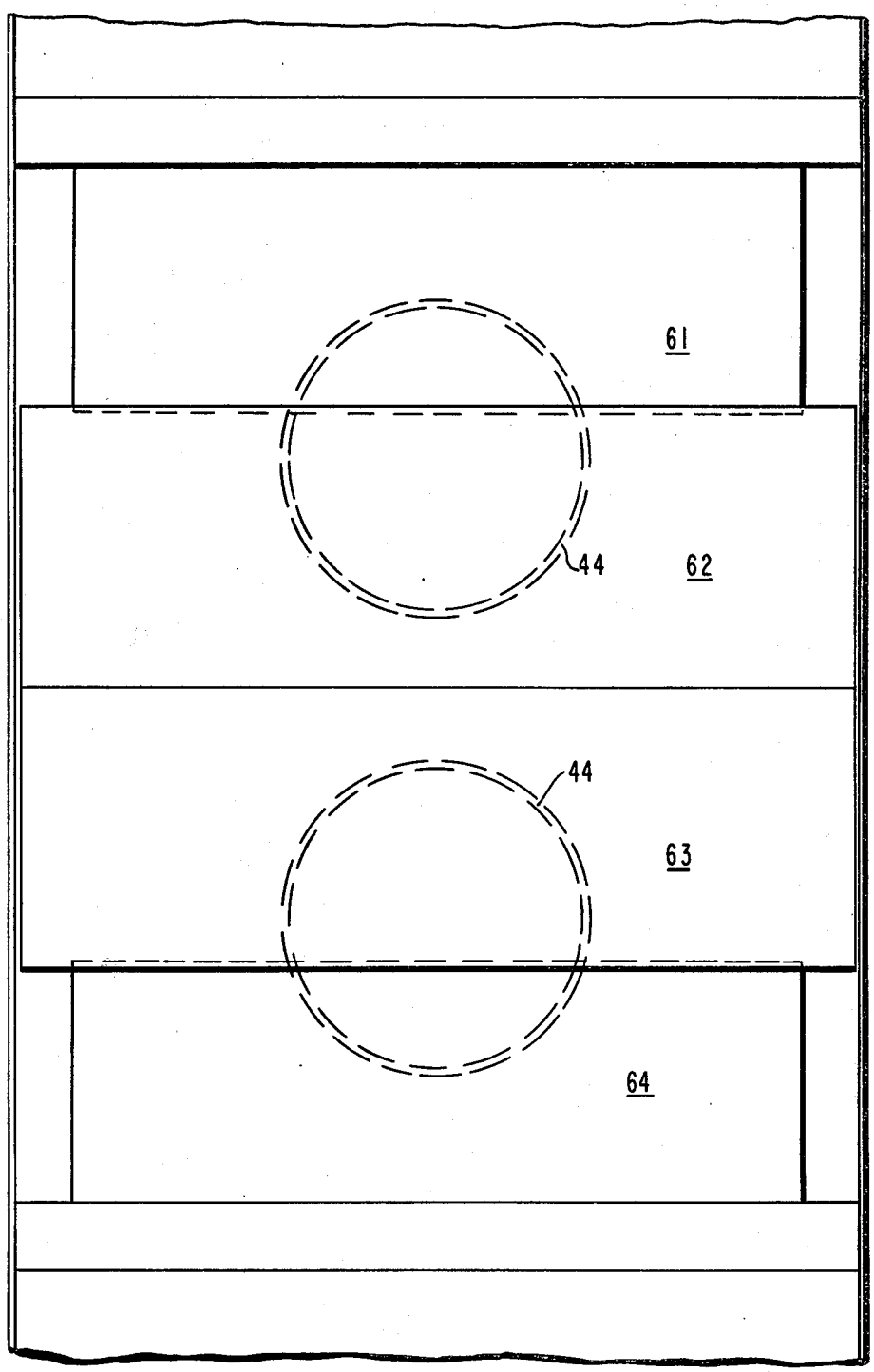
FIG. 2 is an enlarged view, partly in front elevation and partly in section, of the shutter means employed in the switchgear unit of FIG. 1 in the closed position.

Referring to the drawings there is shown in FIG. 1 a portion of a metal clad or metal enclosed switchgear cell or housing 10 which may be constructed by securing sheet metal members to angle frame members 22 in a manner well known in the art. A circuit interrupter or circuit breaker 20 is disposed in the cell 10 and may be moved horizontally into and out of the cell on the wheels 23 which run on rails or tracks, not shown, disposed at the bottom of the cell. The cell 10 includes a front compartment 12 in which the circuit breaker 20 is disposed and a rear compartment 14 in which the power conductors or bus members 30 may be disposed for connection to the circuit breaker 20 through primary disconnecting contacts.

Figure 5:
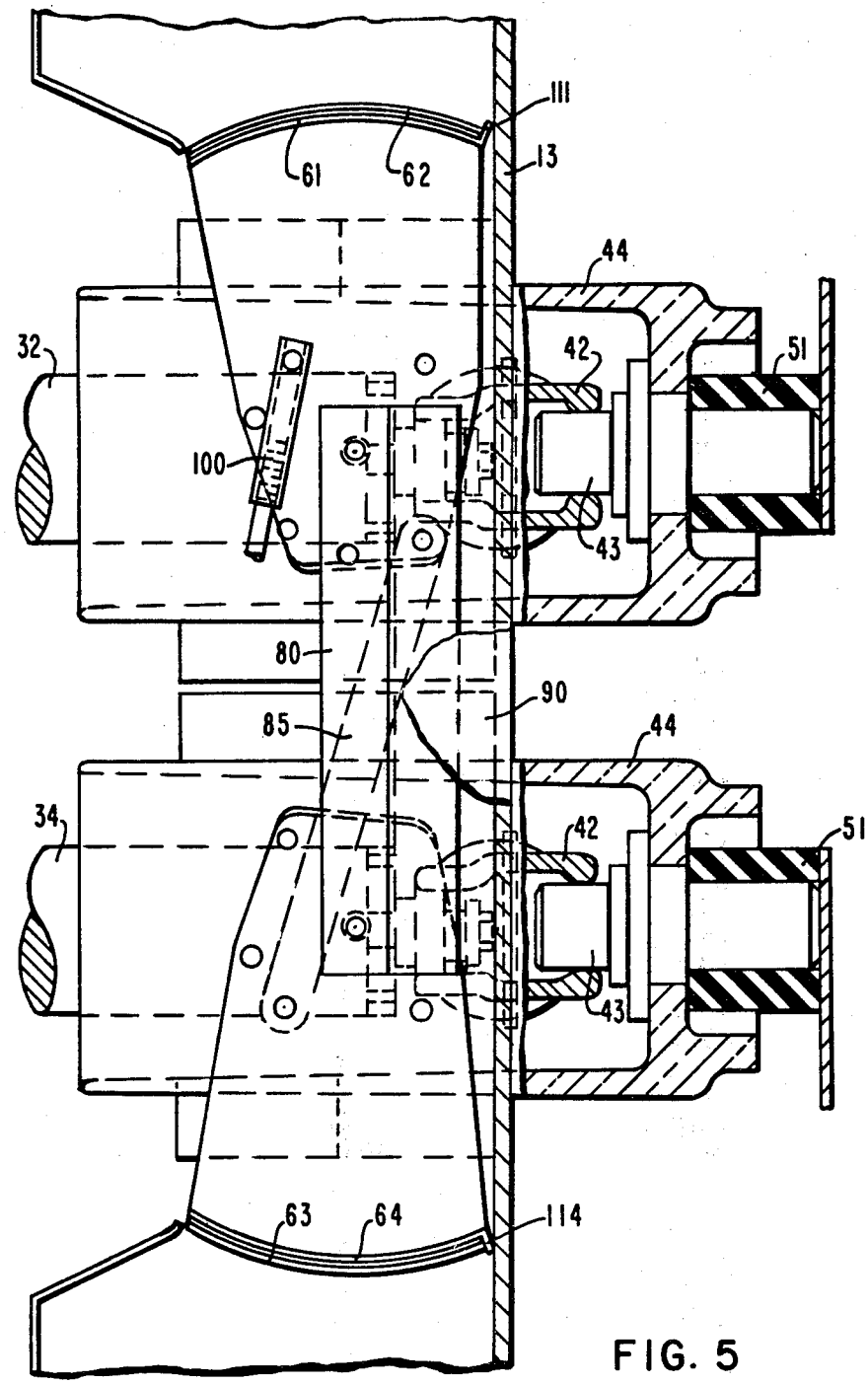
FIG. 5 is an enlarged view, partly in side elevation and partly in section, of the shutter means employed in the switchgear unit of FIG. 1 in the open position.

The circuit breaker 20 includes a plurality of pairs of substantially horizontal insulating bushings 32 and 34 with the bushings of each pair being spaced from one another in a common vertical plane and with the different pairs of bushings being laterally spaced from one another. As shown in FIG. 5, each of the bushings 32 and 34 has mounted at the inner end thereof a primary movable disconnecting contact 42 which is disposed to engage a primary stationary contact 43 which is disposed inside an insulating tube 44 which in trun is mounted in the rear compartment 14 of the cell 10. Each of the stationary contacts 43 is electrically connected to one of the power conductors 50 through an electrical conductor or stud which is electrically insulated by suitable means, such as an insulating tube 51. In order to separate or isolate the front compartment 12 from the rear compartment 14 of the cell 10, the partition member 13 is disposed therebetween. The partition member 13 also supports the insulating tubes 44.

Figure 3:
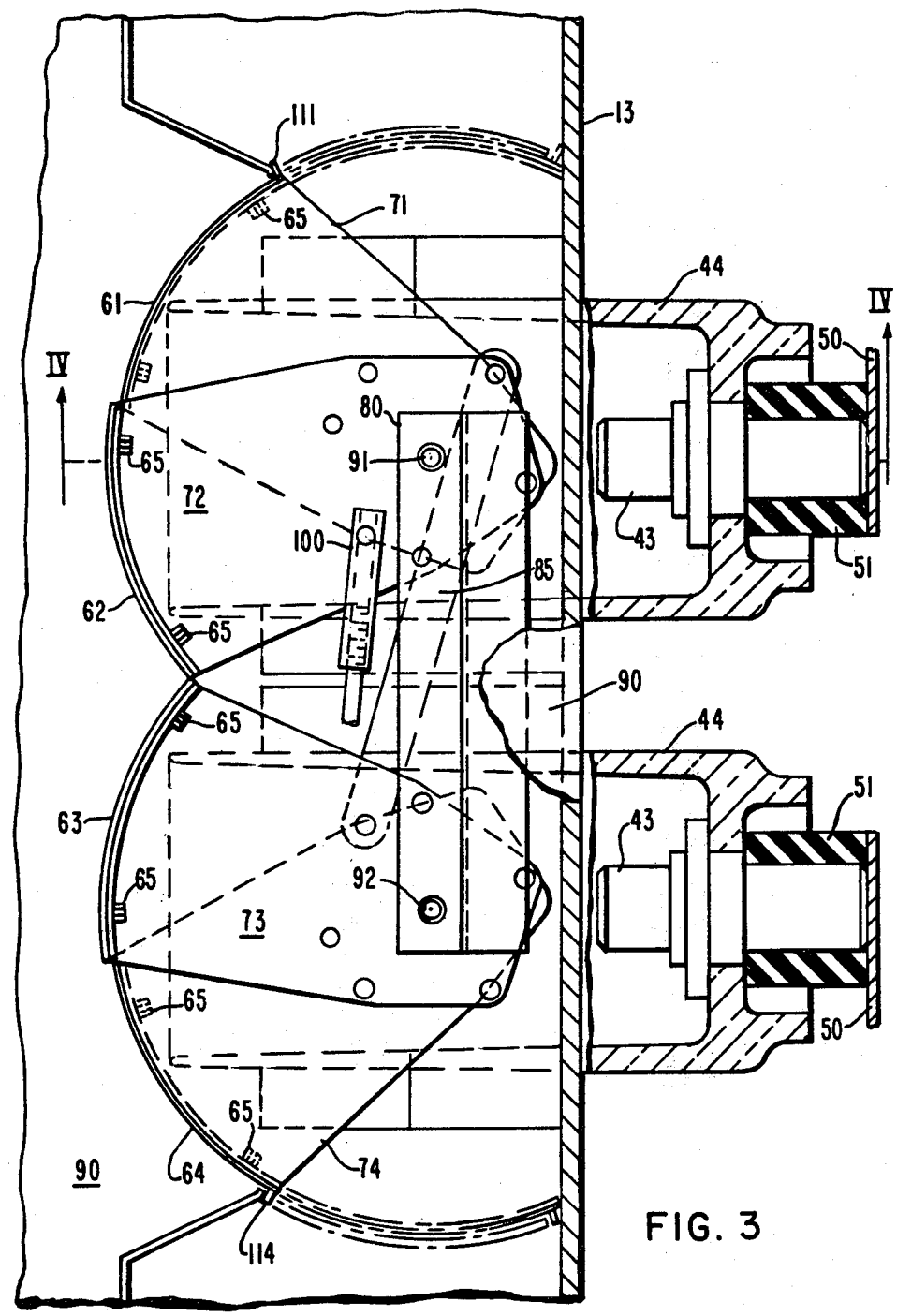
FIG. 3 is an enlarged view, partly in side elevation and partly in section, of the shutter means shown in FIG. 1 in the closed position.
Figure 4:
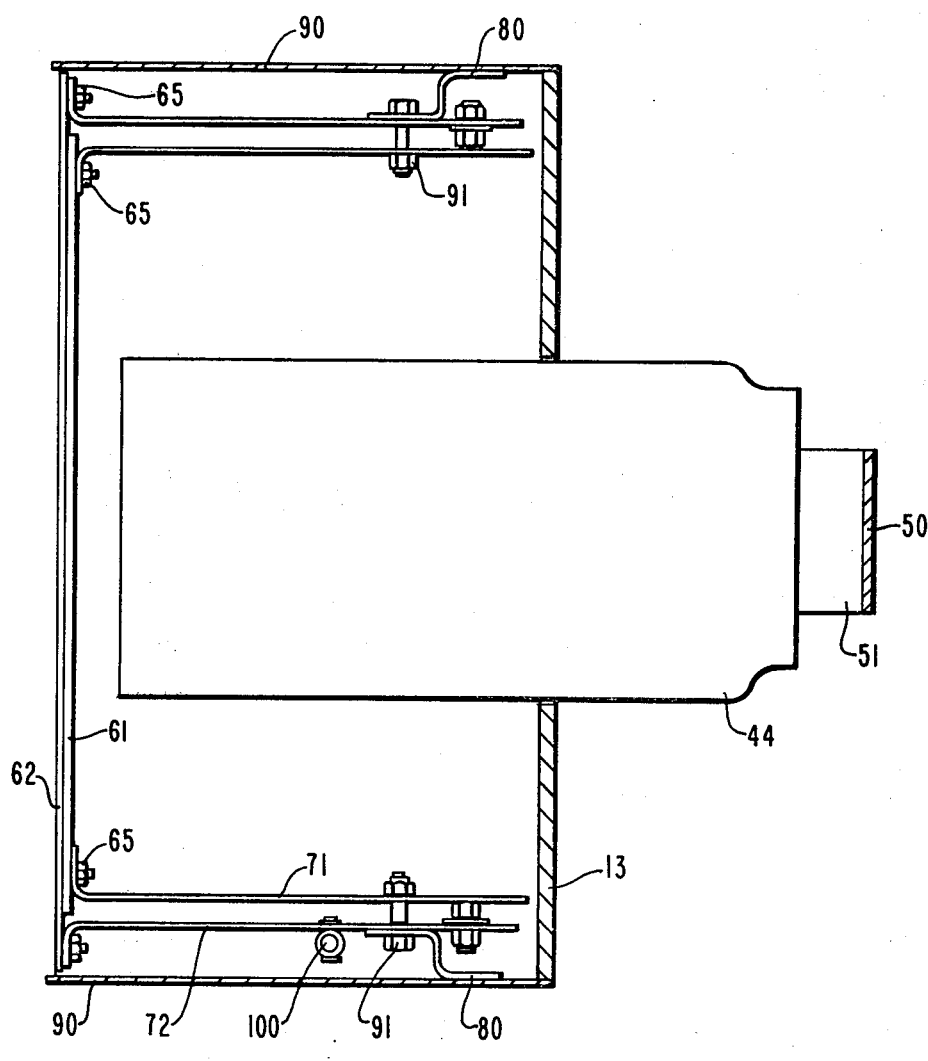
FIG. 4 is an enlarged view, partly in top elevation and partly in section of the shutter means shown in FIG. 3.

In order to control communication between the front compartment 12 and the rear compartment 14 through the partition member 13, a shutter means 61, 62, 63, and 64, shown in FIG. 3 are disposed in front of the insulating tubes 44. The shutters are generally curvilinear in configuration and formed from a sheet metal material, such as steel or aluminum. The shutters are supported by generally L-shaped mounting brackets 71, 72, 73, 74 by means of mounting screws 65. A generally S-shaped mounting bracket 80 is welded or brazed to the sheet metal 90 forming the metal enclosed switchgear cell for a housing 10. Mounting bolts 91 and 92 support the shutter members and its associated mounting brackets in pairs such that shutters 61 and 62 entirely cover the upper insulating bottles 44 and surrounding area and are disposed to pivot about mounting bolt 91 in a generally curvilinear motion. Also, shutters 63 and 64 and their associated mounting brackets are disposed to entirely cover the lower insulating bottle 44 and surrounding area and pivot in a generally curvilinear motion about the mounting bolt 92. The combination of shutters 61, 62, 63 and 64 entirely isolate the contacts and insulating tubes.

For simultaneous operation of the shutters, a lever 85 connects the mounting bracket 72 to the mounting bracket 73 for operation in a manner hereinafter described. In explaining the operation of the shutter means which automatically result upon movement of the circuit breaker 20 either into or out of the cell 10, it will be assumed initially that the shutter means is in the closed position as shown in FIG. 3. Actuating lever members 101 are disposed inside the cell 10 and at opposite sides thereof, as best shown in FIG. 1. Each of the lever members 101 may be rotatably supported by an associated pivot member 102 which in turn may be mounted on one of the vertical angle members 22. Each of the lever members 101 also includes a cam portion comprising a first cam portion, as indicated at 103, which is substantially vertical when the circuit breaker 20 is in its normal operating position as shown in FIG. 1, and a second substantially flat cam portion, as indicated at 104, which is substantially horizontal when the circuit breaker 20 is in its normal operating position shown in FIG. 1. In order to actuate the lever members 101 for rotation about the associated pivot members 102 and in turn to actuate the associated shutters 61, 62, 63 and 64 in a generally curvilinear motion in accordance with the movement of the circuit breaker 20 either into or out of the cell 10, a roller member 105 is mounted on either side of the circuit breaker 20 to project outwardly therefrom into the plane of movement of one of the levers 101 to engage the cam portion of said lever members whenever the circuit breaker 20 is moved either into or out of the cell 10 to actuate said lever members for rotational movement.

The rotatable lever members 101 are fixedly connected to a shutter operating arm 100 shown in FIG. 3 in a manner well known to those skilled in the art to cause an upward and downward motion. As the circuit breaker 20 is moved into the switchgear cell the lever member 101 rotates generally in a clockwise direction causing the shutter operating arm 100 to move generally upward, thus moving the shutter support member 72 and shutter 62 in a generally curvilinear motion above the upper insulating bottle 44 while at the same time the connecting arm 85 moves the supporting bracket member 73 and the associated shutter 63 in a generally downward curvilinear motion in a direction below the lower insulating bottle 44. As shutter 62 moves upward it engages a projection 111 of shutter 61 and causes the shutter 61 to continue in the generally curvilinear direction of shutter 62 until it reaches a position above the upper insulating bottle 44. Also, shutter 63 as it moves in its generally curvilinear motion below the lower insulating bottle 44 engages projection 114 on shutter 64 to cause it to move in the generally curvilinear direction to a position below the lower insulating bottle 44.

Referring now to FIG. 5 it can be seen that movement of the circuit breaker 20 into the switchgear cell 10 causes the shutters 61, 62, 63 and 64 to move to a position above and below the insulating bottles 44 so that the movable contacts of the circuit breaker 42 can make engagements with the stationary contacts 43 of the switchgeaer cell.

As the circuit breaker 20 is withdrawn from the switchgear cell 10, the above-described action is reversed as the rotatable lever members 101 are now moved in a clockwise direction causing the shutter operating arm 100 to move generally in a downward direction bringing the shutters 61 and 62 generally downward in a curvilinear motion to cover the upper insulating bottle while at the same time lever 85 causes the shutters 63 and 64 to move generally in an upward curvilinar motion to cover the lower insulating bottle 44 as shown in FIG. 3.

It can be readily seen that there is provided by this invention a new and improved shutter mechanism which by providing an entirely grounded metal barrier adequately protects from accidental communication of any personnel entering the cell 10 with the primary stationary contacts disposed in the rear compartment 14 when the circuit breaker 20 is removed and provides a more efficient and effective disposal of the grounded metal shutters to a position with a sufficient distance from any live electrical parts to prevent failure of the apparatus.

Although there has been illustrated and described a specific embodiment, it is clearly understood that the same were merely for purposes of illustration and that changes and modifications may be readily made therein by those skilled in the art without departing from the spirit and scope of this invention.

We claim:
1. Electrical apparatus, comprising:
   (a) a housing means;
   (b) stationary contact means disposed generally within said housing means;
   (c) movable contact means disposed to engage said stationary contact means;
   (d) a plurality of curvilinear displaced barrier means, each barrier means having at least two tandem and mechanically cooperating members disposed generally within said housing means having a first serial position for electrically shielding said stationary contact means from any electrical engagement and a second tandem position for allowing engagement of said stationary contact means with said movable contact means; and
   (e) actuating means mechanically connected to said movable contact means and to at least one member of each of said plurality of curvilinear displaced barrier means for moving said curvilinear displaced barrier means between said first and second positions when the movable contact means is placed into engagement with the stationary contact means.

2. Electrical apparatus as recited in claim 1 wherein each of said curvilinear displaced barrier means is comprised of a first and second member, said first member being mechanically connected to said actuating means and disposed to be moved thereby into engagement with said second member and thus moving both members into the second tandem position.

3. Electrical apparatus as recited in claim 1 wherein said curvilinear displaced barrier means has a metallic construction.

4. Electrical apparatus, comprising:
   (a) a housing means;
   (b) a plurality of stationary contact means disposed generally within said housing means;
   (c) a plurality of movable contact means disposed to engage said plurality of stationary contact means;
   (d) a plurality of curvilinear displaced barrier means, each barrier means having at least two tandem and mechanically cooperating members disposed generally within said housing means having a first serial position for electrically shielding said plurality of stationary contact means from any engagement and a second tandem position for allowing engagement of said plurality of stationary contact means with said plurality of movable contact means; and
   (e) actuating means mechanically connected to said plurality of movable contact means and said plurality of curvilinear displaced barrier means for moving said plurality of curvilinear displaced barrier means between the first and second positions when the plurality of movable contact means is placed into engagement with the plurality of stationary contact means.

5. Electrical apparatus as recited in claim 4 wherein each of said curvilinear displaced barrier means is comprised of a first and second member, said first member being mechanically connected to said actuating means and disposed to be moved thereby into engagement with said second member and thus moving both members into the second tandem position.

6. Electrical apparatus as recited in claim 4 wherein said curvilinear displaced barrier means has a metallic construction.

7. Electrical switchgear apparatus comprising:
 (a) a housing means;
 (b) a plurality of stationary contact means disposed within said housing means;
 (c) a removable circuit breaker means having a plurality of removable contact means disposed to engage said plurality of stationary contact means within said housing means;
 (d) a plurality of curvilinear displaced barrier means, each barrier means having at least two tandem and mechanically cooperating members disposed generally within said housing means having a first serial position for electrically shielding said plurality of stationary contact means from any engagement and a second tandem position for allowing engagement of said plurality of stationary contact means with said plurality of removable contact means; and
 (e) actuating means mechanically connected to said circuit breaker means and said plurality of curvilinear displaced barrier means for moving said plurality of curvilinear displaced barrier means to said second position upon entry of said circuit breaker means into said housing means.

8. Electrical switchgear apparatus as recited in claim 7 wherein each of said curvilinear displaced barrier means is comprised of a first and second member, said first member being mechanically connected to said actuating means and disposed to be moved thereby into engagement with said second member and thus moving both members into the second tandem position.

9. Electrical switchgear apparatus as recited in claim 7, wherein said curvilinear displaced barrier means has a non-magnetic metallic construction.

10. Electrical switchgear apparatus comprising:
 (a) a housing means;
 (b) a first plurality of horizontally aligned stationary contact means disposed above a second plurality of horizontally aligned stationary contact means within said housing means;
 (c) a removable circuit breaker means having a first and second plurality of horizontally aligned removable contact means disposed to engage said first and second plurality of horizontally aligned stationary contact means within said housing;
 (d) a plurality of curvilinear displaced barrier means, each barrier means having at least two tandem and mechanically cooperating members disposed generally within said housing means having a first serial position for electrically shielding said first and second plurality of horizontally aligned stationary contact means from any engagement and a second tandem position above said first plurality of horizontally aligned contact means and below said second plurality of horizontally aligned contact means for allowing engagement with said first and second plurality of horizontally aligned removable contact means; and
 (e) actuating means mechanically connected to said circuit breaker means and said plurality of curvilinear displaced barrier means for moving said plurality of curvilinear displaced barrier means between said first and second positions upon entry of said circuit breaker means into said housing means.

11. Electrical switchgear apparatus as recited in claim 10 wherein each said curvilinear displaced barrier means is comprised of a first and second member, said first member being mechanically connected to said actuating means and disposed to be moved thereby into engagement with said second member and thus moving both members into the second tandem position.

12. Electrical switchgear apparatus as recited in claim 10, wherein said curvilinear displaced barrier means has a metallic construction.

* * * * *